United States Patent [19]

Rawlings

[11] Patent Number: 4,468,184
[45] Date of Patent: Aug. 28, 1984

[54] GAS FEED MEANS FOR USE IN CENTRIFUGAL CASTING DEVICES

[75] Inventor: David L. Rawlings, Bayville, N.Y.

[73] Assignee: International Hydron Corporation, New York, N.Y.

[21] Appl. No.: 490,626

[22] Filed: May 2, 1983

[51] Int. Cl.³ .................. B28B 17/00; B29D 11/00; B29G 7/00
[52] U.S. Cl. .................................... 425/73; 264/2.1; 264/85; 264/311; 425/210; 425/434; 425/808
[58] Field of Search ............. 425/203, 73, 808, 434, 425/210; 264/83, 85, 310, 311, 2.1, 1.1, 297; 164/259, 286; 222/152; 432/125; 65/71, 302

[56] References Cited

U.S. PATENT DOCUMENTS

| | | | |
|---|---|---|---|
| 2,009,025 | 7/1935 | Sargent et al. | 164/286 |
| 2,714,236 | 8/1955 | Simmons | 164/259 |
| 3,046,600 | 7/1962 | Linhorst | 264/323 |
| 3,107,141 | 10/1963 | Crafton | 264/109 |
| 3,165,565 | 1/1965 | Cox et al. | 264/302 |
| 3,290,423 | 12/1966 | Hatch et al. | 264/294 |
| 3,408,429 | 10/1968 | Wichterle | 425/425 |
| 3,660,545 | 5/1972 | Wichterle | 264/2.1 |
| 4,153,349 | 5/1979 | Wichterle | 351/160 H |
| 4,211,269 | 7/1980 | Bentz et al. | 164/259 |
| 4,422,984 | 12/1983 | Neefe | 264/2.1 |

FOREIGN PATENT DOCUMENTS 159359 8/1975 Czechoslovakia .

Primary Examiner—James B. Lowe
Assistant Examiner—Michael McGurk
Attorney, Agent, or Firm—Vincent P. Pirri

[57] ABSTRACT

An improved gas feed means adapted to accommodate and secure the lower end of a polymerization column for synchronous rotation therewith and adapted to supply a controlled amount of a gaseous medium, such as nitrogen, into and through the rotating polymerization column so as to purge any undesirable gas within the polymerization column that could adversely affect the quality of the objects being centrifugally casted.

10 Claims, 6 Drawing Figures

GAS FEED MEANS FOR USE IN CENTRIFUGAL CASTING DEVICES

DESCRIPTION

1. Technical Field

The present invention relates to an improved gas feed means for use in centrifugal casting devices employing a rotatable polymerization column adapted for receiving in vertical series a plurality of molds containing a polymerizable or curable composition. In various aspects, the present invention relates to a gas feed means adapted to accommodate and secure the lower end of a polymerization column for synchronous rotation therewith and adapted to supply a controlled amount of a gaseous medium, such as nitrogen, into and through the rotating polymerization column so as to purge any undesirable gas within the polymerization column that could adversely affect the quality of the objects being centrifugally cast.

2. Background Art

It is known that the polymerization casting of axially symmetrical articles, such as contact lenses, can be performed by using equipment in which individual molds are arranged in a carousel or in a vertical stack configuration. These individual molds, characterized by an outer cylindrical wall and a mold cavity with an exposed concave bottom surface and containing a liquid polymerizable mixture in the cavity, are caused to rotate about their vertical axis at a rotational speed (and under polymerization conditions) sufficient to create a centrifugal force which causes a radially outward displacement of the liquid reactants in the mold. By maintaining the rotating mold(s) under predetermined and known polymerization conditions, the outwardly displaced liquid reactants are caused to polymerize to a solid polymeric contact lens. The resulting lens is characterized by a convex optical surface which corresponds to the concave surface of the mold and a concave optical surface whose geometry has been created, to a significant degree, by the centrifugal force(s) employed during the polymerization cycle.

In the centrifugal casting of contact lenses on a commercial scale, it is preferred for the attainment of good yield to effect the polymerization or curable reaction under an inert gaseous medium such as argon or nitrogen. This is due to the fact that the oxygen component of air entrained within the polymerization column can inhibit the polymerization reaction and adversely affect the quality and acceptability of the contact lens product. A controlled feed of nitrogen through the polymerization column will purge any entrained air in the polymerization zone and provide an inert environment for conducting the polymerization process.

The aforesaid carousel arrangement is rather complex and quite large with respect to the size of the molds. It requires that each mold be individually rotated on its own separate vertical axis. It is reported that the carousel arrangement suffers from the disadvantages of requiring excess inert gas to eliminate the inhibiting effect of oxygen (in the air) present during the polymerization reaction. The use of excess inert gas during the polymerization of the monomeric reactants causes the entrainment of monomer in the form of avpors and the subsequent deposition and/or polymerization on the walls and equipment. Further information is set forth in U.S. Pat. No. 3,660,545, issued May 2, 1972, the full disclosure of which is incorporated by reference as it set out in full text.

In the vertical stack arrangement a rotatable polymerization tube having an internal circular cross-sectional geometry is adapted to receive at one end of the tube a plurality of circular molds which become seated to one another in the said tube, each mold containing the liquid polymerizable reactants in the mold cavity. In operation, the molds are gravity fed into the upper end of the polymerization tube and free-fall through the tube against an upwardly flowing inert gas, e.g., carbon dioxide, due to their own weight. The exit end of the tube is seated tightly on a revolving plate member which imparts the rotation to the tube and which plate has a centrally defined opening for discharging inert gas into the polymerization tube to contact the descending gravity fed molds. In this type of construction, the revolving plate member would have to be disconnected and displaced from the polymerization column to remove the molds. In addition, the feeding of the inert gas from the center of the revolving plate member into the polymerization column and onto the bottom surface of the bottommost mold could impede the rotation of this mold and thereby prevent the molds within the tube from being rotated at the same speed due to undesirable slippage between the molds and the inner wall of the polymerization column.

OBJECTS OF THE INVENTION

Accordingly, one or more objects will be achieved by the practice of the invention.

Objects of the invention are for an improved gas feed means for use in centrifugal casting devices employing a rotatable polymerization column adapted for receiving in vertical series a plurality of molds containing a polymerizable or curable composition, such as a lens-forming mixture of monomer, prepolymer or vulcanizable components, to reproduce articles of high precision and exactness in detail, such as soft contact lenses.

Another object of the invention is to provide a novel gas feed means adapted to accommodate and secure the lower end of a polymerization column for synchronous rotation therewith and adapted to supply a controlled feed of a gaseous medium, such as an inert gas of nitrogen or argon, into and through the rotating polymerization column so as to purge any undesirable gas within the polymerization column that could adversely affect the quality of the objects being centrifugally casted.

Yet another object of the invention is to provide a novel gas feed means for use with a rotatable polymerization column that is adapted to feed a controlled amount of an inert gas into and through the polymerization column on a continuous basis while the column is rotating and which will not block the exiting of the molds out of the polymerization column so as to provide a continuous operation for automatically producing articles such as contact lenses, artificial heart valves, diaphragms and the like.

The foregoing as well as additional objects will become fully apparent from the following description and the accompanying drawings.

DISCLOSURE OF THE INVENTION

The invention relates to an improved gas feed means for use in a centrifugal casting device employing a rotatable polymerization column adapted for receiving in vertical series a plurality of molds containing a polymerizable or curable composition; said improved gas feeding means comprising a rotatable sleeve member having an upper and lower portion, said upper portion being adapted to accommodate and secure the lower end of said polymerization column for synchronous rotation therewith and said lower portion having gas discharge means for discharging gas into said polymerization column, support means associated with said lower portion of said rotatable sleeve member including gas inlet means for receiving a supply of gas, bearing means disposed between said support means and said sleeve member to allow said sleeve member to be freely rotated with respect to said support means, means for defining a confined zone within said support means between said gas inlet means and said gas discharge means, and said gas inlet means, gas discharge means and confined zone being in gas flow communication such that a gaseous medium fed through said gas inlet means will flow into said confined zone through said gas discharge means and into and through said polymerization column.

Preferably the rotatable sleeve member could comprise a tubular upper portion having an internal liner of a resilient or plastic material defining a cross-sectional opening sufficient to receive and secure the lower end of a rotatable polymerization column to provide synchronous rotation therewith. Accordingly, the cross-sectional opening defined by the tubular upper portion of the sleeve member could be circular to accommodate a circular polymerization column, triangular to accommodate a triangular polymerization column, square to accommodate a square polymerization column and the like.

Preferably the lower portion of the sleeve member could compromise a tubular portion defining a cross-sectional opening smaller than the cross-sectional opening defined in the upper portion and being adapted to be axially aligned below the opening in the polymerization column such that molds exiting through the polymerization column will descend through the opening in the lower portion of the sleeve member and be ejected onto a receiving station. Preferably the lower portion should be adapted for seating within and being separated from a stationary support member by bearing means to allow the sleeve member to be freely rotated within said support members. The support member would include at least one gas inlet opening defined in its wall for receiving a supply of gas and the lower portion of the sleeve would have at least one and preferably a plurality of circumferential spaced-apart opening defined in its side walls for discharging a flow of gas into and through the axially aligned polymerization column. The bearing means could comprise a bearing pair separated by support members such that the bearing means will define a confined zone within the support member that would include the at least one gas inlet opening in the support member in communication with the opening(s) in the lower portion of the sleeve member such that a gaseous medium fed into the at least one gas inlet opening in the support member will flow into the confined zone defined by the bearing pair, through the gas discharge opening(s) in the sleeve member and into and through the polymerization column. By providing a confined zone between the lower portion of the sleeve member and the support member, an inert gas can be controllably fed into the polymerization column so that the polymerization or curable reaction can take place under an inert gaseous medium to continuously yield quality reproducible cast articles such as soft contact lenses, disc valves for surgical applications, and the like. As stated above any oxygen component of air entrained within the polymerization zone of the column can inhibit the polymerization reaction which could result in adversely affecting the quality and acceptability of centrifugal cast articles such as contact lenses.

The polymerization column and mold arrangement for use with the novel feed means of this invention can be of the type which employs a rotatable polymerization tube having an internal circular cross-sectional geometry that is adapted to receive at one end of the tube a plurality of circular molds each of which contain liquid polymerizable reactants in the mold cavity and wherein said molds become seated to one another in said tube. In operation, the molds are gravity fed into the upper end of the polymerization tube and free-fall through its tube whereupon an inert gas will be circumferentially fed from the gas feed means of this invention into the polymerization column to purge any undesirable gas therein, such as air, and thereby provide an inert environment for the polymerization process to occur. Preferably, the novel gas feed means of this invention can be used with the centrifugal device for casting symmetrical or asymmetrical objects as disclosed in copending application Ser. No. 490,634 filed on May 2, 1983 by the same assignee or the subject application. The disclosure of this application, to the extent intended herein, is incorporated by reference as if set out in full text. Specifically, the centrifugal casting device disclosed in this application comprises a rotatable polymerization tube adapted for rotation about a vertical (longitudinal) axis and adapted for receiving in vertical series a plurality of molds containing a polymerizable or curable composition and securing means for securing a plurality of molds in vertical series in an interference fitting and sliding relationship within said tube such that the securing means is adapted to concentrically dispose said molds to the vertical axis of said polymerization tube. In the preferred embodiment of this application, the securing means which secure the molds within the polymerization tube can be at least two, preferably at least three, spaced apart longitudinal projections on the inner surface of the polymerization tube which would provide an interference fit for the molds. The radially inward longitudinal projections on the tube, such as ridges, could form an integral part of the tube and be made of the same material or could be separate components secured to the inner surface of the tube in a conventional manner using an adhesive or the like. The material constituting the projection should be sufficiently hard to withstand the frictional contact made with the outer wall of the molds without exhibiting excessive wear that could minimize or destroy the interference fit required between the molds and the contact surface of the polymerization tube. The inner diameter of the contact points of the tube could be equal to or preferably slightly smaller than the outer diameter of the mold so as to insure an interference fit but slidable relationship therebetween. to compensate for excessive frictional wear, the projections could be made of a resilient material that would substantially recover its size and shape after being deformed by the molds fed into the polymerization tube. The resilient projections would generally provide contact points with the outer wall of the mold and would fall on the circumference of a circle (from a cross-sectional view of the tube) whose inner diameter within the tube is smaller than the inner diameter of the tube employing a hard material as the inward projections. The use of a resilient material would provide for the securement of the molds within the tube to insure that the concentricity of the molds with the spin axis of the tube is maintained while providing for the synchronized rotation of the molds with the rotation of the tube. In another embodiment of this disclosure, the outer wall of the molds rather than the inner surface of the tube may contain at least two, preferably at least three, spaced apart projections to provide the interference fit required to insure that the horizontal axis of the molds are maintained substantially perpendicular to the vertical (longitudinal) axis of the tube. In a like manner, the protrusions can be either made as an integral part of the mold material or alternately can be a separate hard or resilient component that could be secured to the outer wall of the molds in a conventional manner.

In the above embodiment utilizing an interference fitting and sliding relationship for the molds within the polymerization tube, channels are defined between adjacent projections which will permit a gaseous medium such as an inert gas to be directed up through the rotating tube so as to purge any undesirable gas within the tube and to create an inert environment for the polymerization reaction to occur. It is also possible to have the polymerization column made with internal longitudinal grooves which can be used as longitudinal gas channels for receiving the inert gas discharged from the gas feed means of this invention. Whatever embodiment is used, space or channels should be provided between the peripheral wall of the molds and the internal surface of the polymerization column to permit the gas fed into the lower end of the column from the novel gas feed means of this invention to ascend up and through the column.

By the practice of the inventions contemplated herein, there can be produced precision articles of predetermined and exacting details and dimensions, e.g., small medical devices such as heart valves and diaphragms; contact lenses; and others. Such articles, depending on the ultimate use, can be hard, flexible, or soft and they may be hydrophillic or hydrophobic.

Any fluid polymerizable, curable or moldable reactant or mixture with/without an inert or reactive solvent which is/are capable of being displaced outwardly due to the rotation of the column, i.e., by the resultant centrifugal forces, can be employed in the practice of the invention. The medium comprising the reactant(s) constitute a homogenous liquid and is capable of forming a desired shaped article during the centrifugal casting operation. The article may be opaque, translucent or transparent depending on the ultimate use of the cast article formed. For instance, it is not generally a necessity that diaphragms and artificial heart valve substitutes obtained by the practice of the invention be colorless and transparent. On the other hand, for example, it is a requirement that soft hydrophilic contact lenses be fully transparent, of good optical quality, soft and resilient as well as possessing other necessary and desirable characteristics.

In particular, a centrifugal casting device coupled to the novel gas feeding means of this invention device can be utilized in the manufacture of a wide variety of contact lenses which can be symmetrical or asymmetrical; hard, flexible or soft; water absorptive or non-water absorptive; low, medium, or high oxygen permeability or transportability; and the like. By choosing suitably designed mold cavities or bottoms there can be obtained a wide variety of modified lens shapes, e.g., toric, bifocal, truncated and/or ballasted contact lenses. A wide variety of materials or construction can be employed to fabricate the molds; see, for example, U.S. Pat. No. 3,660,545. For the preparation of hydrophilic articles such as soft contact lenses a mold fabricated of polypropylene is suitable. To insure proper wetting of the optical surface of the mold by the lens-forming mixture it is desirable to first pretreat or hydrophilize the said surface by known methods.

The liquid lens-forming mixture can comprise monomer, prepolymer or vulcanizable components. Particular suitable components are hydrophilic monomers preferably including those which form slightly or moderately corsslinked, three dimensional networks such as those disclosed in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; the alkyl substituted N-vinyl pyrrolidones, e.g., methyl substituted N-vinylpyrrolidone; glycidyl methacrylate; glycidyl acrylate; the unsaturated amines; the alkyl ethyl acrylates; solubilized collagen; mixtures thereof; and others known to the art.

Hydrophilic monomers particularly useful in the practice of the invention to manufacture contact lenses include hydrophobic acrylic esters, suitably lower alkyl acrylic esters, preferably wherein the alkyl moiety contains 1-5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or mixtures thereof.

Other suitable monomers include the ethylenically unsaturated monocarboxylic acid esters, in particular, the methacrylic and acrylic acid esters of siloxane monomers and polymers with/without a pendant hydroxyl group. These monomers are well documented in the contact lens art; see, for example, U.S. Pat. Nos. 4,139,548; 4,235,985; 4,152,508; 3,808,178; 4,139,692; 4,248,989; and 4,139,513. The disclosure of the foregoing illustrative patents, to the extent intended herein, are incorporated by reference as if set out in full text.

Among the preferred monomeric mixtures are those which contain at least one alkylene glycol monoester of methacrylic acid, especially ethylene glycol monomethacrylate, and at least one crosslinking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, glycidyl methacrylate, N-methylacrylamide, diethylene glycol monomethacrylate, and others illustrated above.

The above illustrated monomers, monomeric mixtures including mixtures of hydrophobic and hydrophilic reactants, may be further admixed with a minor proportion of di- or polyfunctional polymerizable species to cause crosslinking of the polymeric matrix as polymerization or curing proceeds. Examples of such di- or polyfunctional species include: divinylbenzene, ethylene glycol diacrylate or methacrylate, propylene glycol diacrylate or methacrylate, and the acrylate or methacrylate esters of the following polyols: triethanolamine, glycerol, pentaerythritol, butylene glycol, diethylene glycol, triethylene glycol, tetraethylene glycol, mannitol, sorbitol and the like. Other crosslinking monomers can be illustrated by N,N-methylene-bis-acrylamide or methacrylamide, sulfonated divinylbenzene, and divinylsulfone.

Additional lens-forming materials which are suitable in the fabrication of contact lenses are illustrated by one or more of the following U.S. Pat. Nos. 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524; 3,700,761; 3,721,657; 3,758,448; 3,772,235; 3,786,034; 3,803,093; 3,816,571; 3,940,207; 3,431,046; 3,542,461; 4,055,378; 4,064,086; and 4,062,627.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc.; and mixtures thereof. In general, the solvent comprises a minor amount of the reaction medium, i.e., less than about 50 weight percent.

Polymerization of the lens-forming mixture may be carried out with free radical catalysts and/or initiators of the type in common use in vinyl polymerization. Such catalyst species can include the organic peroxides, the alkyl percarbonates, hydrogen peroxides, and inorganic materials such as ammonium, sodium, or potassium persulfate. Polymerization temperatures can vary from about 20° C., and lower, to about 100° C., and higher.

Polymerization of the monomer or prepolymer material can also be effected using, for example, radiation (U.V., X-ray, microwave, or other well-known forms of radiation) with/without the presence of well-known initiator(s) and/or catalyst(s).

When using radiation as the catalyst in the polymerization process, the polymerization column (tube) has to be fabricated from a material that will not impede the transmission of the radiation into the polymerization zone of the column. Glass, such as Pyrex, would be a suitable material for the polymerization column when using radiation as the catalyst. When using other types of catalysts as recited above, the polymerization column could be fabricated from various types of metals such as steel, bronze and the like.

In the fabrication of contact lenses, the lens-forming material is placed in the mold cavity having an optical concave surface wetted by said material, and then intermittently fed, one at a time, into the inlet end of a rotating polymerization column which desirably comprises a "conditioning" zone near the inlet end and a polymerization reaction zone toward the outlet end. It is preferred that the molds be characterized by a pretreated optical surface to increase its hydrophilicity or wettability in a manner well-known in the art. The speed of rotation of the tube and the molds, when secured in interference fitting relationship or gravity fed, is adjusted to cause and/or maintain radially outward displacement of the lens-forming mixture to a predetermined lens configuration which when subjected to the polymerization conditions employed in the tube will form the desired shaped contact lens. Rotational speed of, for example, 300 r.p.m., and lower to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of catalyst, initiator, and/or radiation energy source, and factors discussed previously and readily apparent to the artisan.

BRIEF DESCRIPTION OF DRAWING

The present invention will become more apparent from the following description when considered together with the accompanying drawing which is set forth as being exemplary of embodiments of the present invention and is not intended in any way to be limited thereof and wherein

Referring in detail to FIGS. 1 to 3 there is shown a gas feed means of this invention which includes a rotatable sleeve member 2 having an upper tubular section 4 and a lower tubular section 6. As will be seen, the upper tubular section 4 has a larger cross-sectional area than polymerization column 1 and the lower tubular section 6. Disposed within the upper tubular section 4 is a resilient liner material 8, preferably plastic, that is slightly tapered and adapted for receiving the lower end of polymerization column 1 in frictional securement therein. As shown, the lower end of polymerization column 1 is slightly tapered to permit easy insertion and securement of polymerization tube 1 within liner 8. Although liner 8 is preferably made of plastic, it can be made of any resilient material that would be suitable for securing the lower end of the polymerization column 1 in frictional securement within said liner 8 so that rotation of sleeve member 2 will empart synchronized rotation to polymerization column 1. As shown in FIG. 1, the inner diameter of polymerization column 1 is substantially equal to the inner diameter of lower tubular section 6 of sleeve 2 and axially aligned therewith so that molds 10 (shown in outline form in FIG. 1 and shown in a perspective view in FIG. 6) exiting from polymerization column 1 will be fed into and descend through lower tubular section 6 of sleeve 2.

As shown in FIGS. 1, 2 or 3, a circumferential groove 12 is formed in the outer wall surface of lower tubular section 6 and a plurality of gas inlet openings 14 are circumferentially disposed through and defined by the base of groove 12. A plurality of longitudinal grooves 16 are formed in the inner wall of lower tubular section 6 with each groove 16 extending from a communicating gas inlet opening 14 up through the top of lower tubular section 6. Thus any gas entering inlet opening 14 when molds 10 are disposed within lower tubular section 6 will be directed up through grooves 16 and into the interior of polymerization column 1.

Referring to FIG. 1, lower tubular section 6 of sleeve 2 is disposed within a cylindrical cupped support member 18 having an upstanding cylindrical wall 20 and a base 22 defining an opening 24 which is axially aligned with the opening 26 of lower tubular section 6. Disposed between the upstanding cylindrical wall 20 and lower tubular section 6 is a cylindrical pre-loaded bearing pair 28 including an upper bearing 30 and a lower bearing 32. Separating the bearing pair 28 and supporting upper bearing 30 is an outer support ring 34 disposed adjacent the internal wall 36 of support member 18, and an inner support ring 38 disposed adjacent the outer wall 40 of lower tubular section 6. In assembling the unit, the lower bearing 32 is placed into the cylindrical cupped support member 18 such that its lower surface rests on flange 42. Outer support ring 34 and inner support ring 38 are then disposed on top of lower bearing 32 whereupon upper bearing 30 can then be mounted on top of outer support ring 34 and inner support ring 38. When rotatable sleeve member 2 is inserted within support 18, circular flange 44 disposed on the outer wall of lower tubular section 6 secures the upper bearing 30 in place. A securing ring 46 having an L-shaped cross section is detachably secured to the top of support member 18 by any suitable means such as the threaded elements shown, with its internal flange member 48 securing the upper bearing 30 in proper alignment within support member 18. Each of the bearings 30 and 32 includes an outer fixed race 50 and an inner rotatable race 52 which are spaced apart by conventional ball bearings 56. By this arrangement, sleeve member 2 can be rotated within support member 18 by conventional fly wheel means illustrated generally as 58 and which is operatively associated with a conventional motor driven belt means not shown.

Support member 18 is provided with an opening 60 defined in its side wall into which is secured a hose bar 62 which is adapted to be connected to a gaseous supply means not shown. In FIG. 4 outer support ring 34 is provided with an annular groove 64 disposed in its outer wall. A plurality of openings 66 are circumferentially disposed in the base of groove 64 and extends through its upstanding wall. As shown in FIG. 5, inner support ring 38 defines a plurality of openings 68 extending through its upstanding wall. Referring again to FIG. 1, it will be seen that the spaced apart pre-loaded bearing pair 28 and the spaced apart outer support ring 34 and inner support ring 38 define an annular zone 70.

Figure 1:
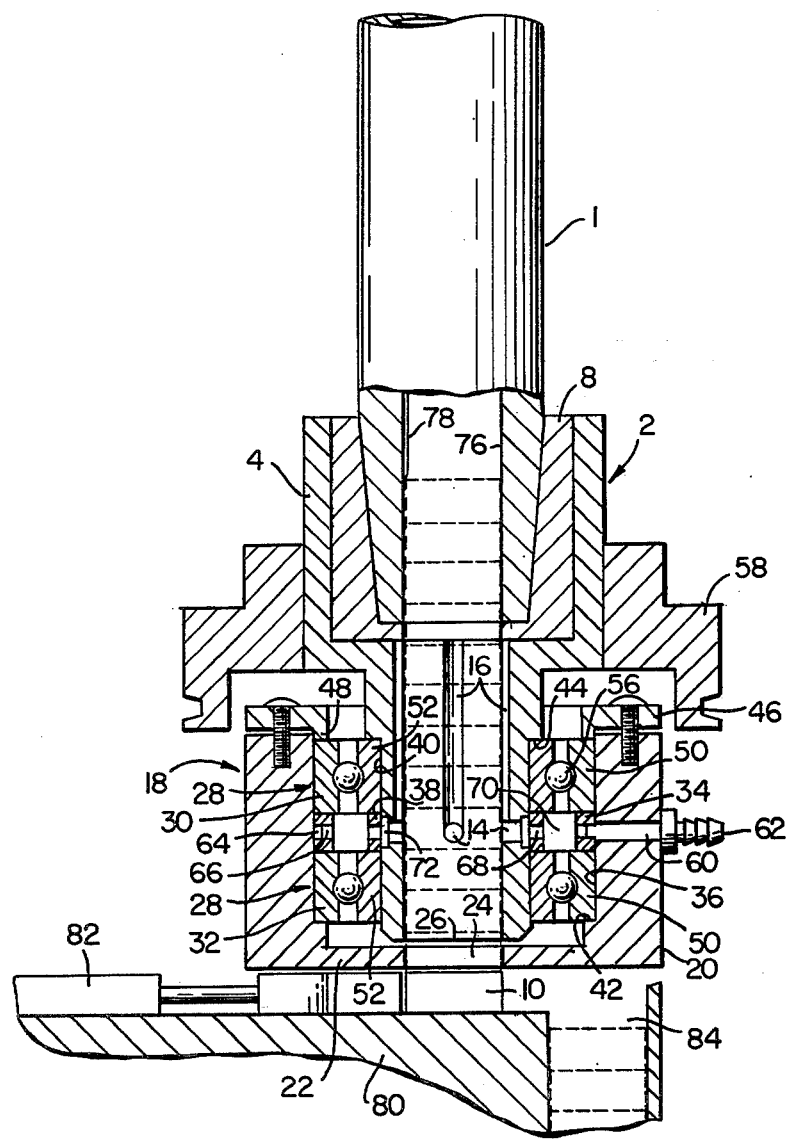
FIG. 1 is a side elevational view partly in cross-section of a preferred gas feed means suitable for use in this invention.
Figure 4:
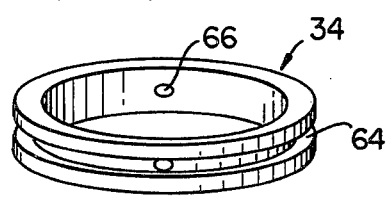
FIG. 4 is a perspective view of the outer support ring member 34 for the bearing pair shown in the gas feed means of FIG. 1.
Figure 5:
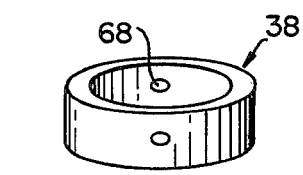
FIG. 5 is a perspective view of the inner support ring member 38 for the bearing pair shown in the gas feed means of FIG. 1.
Figure 2:
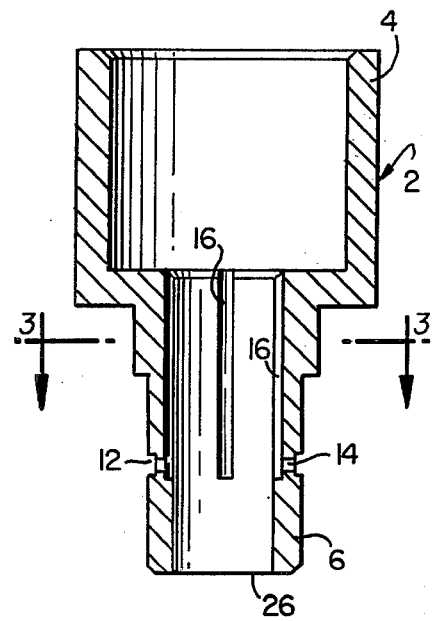
FIG. 2 is a side elevational view in cross-section of the rotatable sleeve member 2 shown in FIG. 1.
Figure 3:
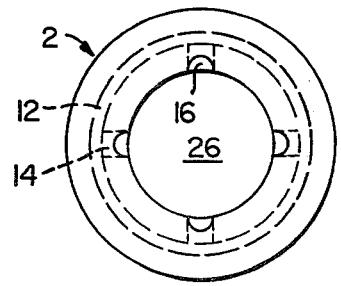
FIG. 3 is a view taken along the lines 3—3 of FIG. 2.
Figure 6:
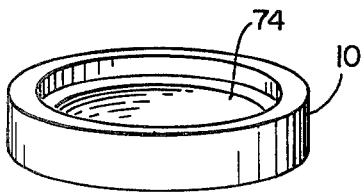
FIG. 6 is a perspective view of a mold for use in this invention.

In the operational mode and with reference to FIGS. 1 to 6, a gaseous medium fed through opening 60 travels along and within circumferential groove 64 and is directed through openings 66 and into annular zone 70. The gaseous medium is then directed through openings 68 in inner support ring 38, into and through openings 14 of lower tubular section 6 and up grooves 16 into the interior of polymerization column 1. The height of inner support ring 38 is greater than the width of circumferential groove 12 in tubular section 6 so that when inner support ring 38 is positioned adjacent groove 12, a circumferential zone 72 is defined that can accommodate a gaseous medium fed through openings 68 of inner support ring 38. This will allow a uniform gas flow to be fed through gas inlet openings 14 and up through grooves 16 into the polymerization column 1.

In the operational mode, mold 10 containing a polymerizable or curable compound in cavity 74 is ejected from the polymerization column 1 into tubular section 6 and with the diameter of the molds substantially equal to the cross-sectional diameter of tubular section 6, the molds 10 will effectively prevent any gaseous medium fed through openings 14 from escaping out opening 26 of tubular section 6. Thus the gaseous inert medium will flow up through grooves 16 into the interior of polymerization column 1 between the peripheral wall of molds 10 and the inner surface of polymerization column 1. If desired, the inner wall 76 of polymerization column 1 could have an longitudinal projection 78 as generally described in copending application Ser. No. 490,634 filed on May 2, 1983. The inert gas fed up through polymerization column 1 will purge any entrained, undesirable gas such as oxygen in polymerization column 1 which could effect the quality and acceptability of the articles being casted. As shown in FIG. 1, an ejected mold 10 exited through opening 26 of the gas feed means will be supported on member 80 whereupon a conventional pusher means 82 will advance the ejected mold 10 to a receptacle 84.

The pre-loaded bearing pair 28, desirably incorporates seals of a conventional type which would provide a retention of lubricants for the bearings. These seals would serve to define the circumferential zone 70 and effectively prevent the escape of any gas to areas other than through the plurality of openings 14 in tubular section 6 or sleeve 2.

It should be understood that the foregoing disclosure relates to a preferred embodiment or gas feed means for use in this invention and could be modified as for example by substituting simple support means rather than the support rings as shown in the drawing. All that is required is that the rotational sleeve member be able to rotate within a support member and have means for providing a zone to accommodate a gaseous medium which can be fed into and up through the rotatable sleeve member into the interior of the polymerization column.

EXAMPLE 1

Polypropylene molds (FIG. 6) having a concave spherical optical surface in the mold cavity can be used in the centrifugal casting of contact lens. The mold dimensions can be: outside diameter —17 mm; inner diameter above mold cavity—15.6 mm; height of mold—7.5 mm; diameter of mold cavity—13.2 mm; central mold cavity radius—7.7 mm; depth of mold cavity (max)—3.3 mm; width of circular horizontal mold shoulder (located between the inner mold wall and mold cavity)—1.2 mm. The hydrophilicity or wettability of the optical surface of the molds can be enhanced by treatment in an oxygen, low temperature, plasma chamber for approximately 18 seconds, 50 watts gauge setting (Model LTA-302, Low Temperature Asher, LFE Corporation, Waltham, Mass.). To a series of these molds, there can be charged, individually, a metered amount of the lens-forming mixture, i.e., approximately 20 milligrams. The lens-forming mixture (based on total weight) could comprise the following recipe:

| Components (Parts by Wt.) | |
| --- | --- |
| 2-Hydroxyethyl Methacrylate: | 84.6 |

-continued

| Components (Parts by Wt.) | |
| --- | --- |
| Ethylene Glycol Dimethacrylate: | 1.0 |
| Benzoin Methyl Ether (initiator): | 0.2 |
| Glycerol: | 14.2 |

The molds can be transported laterally, on a conveyor belt or by positive force means, to the inlet end of a rotating Pyrex column which is supported in an upright position by support means. Said Pyrex column being generally as shown in FIG. 1 as polymerization column 1. The molds can be force fed downwardly, one at a time, into the vertical column by pusher or plunger means having a circular nose which engages the mold at the mold shoulder. When the rotating column is filled with molds (capacity can vary, for instance, from 60 to 120 molds), the force feeding of each mold at the inlet end and the removal or ejection of the bottommost mold (containing the shaped lens product) at the outlet end can be synchronized or automated to effect a continuous process. The speed of rotation of the column about its vertical axis can be about 400 r.p.m. and total residence time of each mold in the column can be about 20 minutes. The rotating column can be maintained at ambient room temperature, i.e., about 20°-22° C. with nitrogen continually flowing upward in grooves 16 (see FIGS. 1 to 3 into the polymerization column 1 to remove any entrained oxygen in the column. In the so-called "conditioning" zone in the upper portion of the column, centrifugal forces created by the column rotation will cause the radially outward displacement of the liquid lens-forming mixture in the spherical mold cavity to be formed onto a predetermined lens shape. The "conditioning" of said liquid material should be maintained for a period of about 15 minutes in its downward decent in the conditioning zone to the polymerization zone. The polymerization zone of the column should likewise be maintained at ambient room temperature. The polymerization reaction can be conducted using UV radiation from a source outside the column (UV source: medium pressure, mercury arc, UV emission—300–400 nm, infrared is filtered, and lamp distance is 3 inches). The residence time in the polymerization zone should be about 5 minutes. A longer residence period can be employed, if desired, as well as subjecting the shaped contact lens blank still in the cavity of the mold to postcure conditions. Immersion in distilled water causes the hydrophilic lens blank to swell which (swelling) causes the separation of the contact lens from the mold. Repeated washings in distilled water insures removal of catalyst or initiator residue and unreacted monomer(s). The contact lens should be finally immersed in physiologic solution (0.9% saline) until it reaches osmotic equilibrium with the solution.

The finished lens will generally have a refractive power (wet) of -6 diopters. It will be optically clear, transparent, inert to bacteria, biocompatable with the cornea, water content of about 39% by weight, dimensionally stable, and exhibits good mechanical properties. It is useful as a daily wear "soft" contact lens.

I claim:

1. An improved gas feed means for use in a centrifugal casting device employing a rotatable polymerization column adapted for receiving in vertical series a plurality of molds containing a polymerizable or curable composition; said improved gas feeding means comprising a rotatable sleeve member having an upper and lower portion, said upper portion being adapted to accommodate and secure the lower end of said polymerization column for synchronous rotation therewith, said lower portion having gas discharge means for discharging gas into said polymerization column, support means associated with said lower portion of said rotatable sleeve member including gas inlet means for receiving a supply of gas, bearing means disposed between said support means and said sleeve member to allow said sleeve member to be freely rotated with respect to said support means, means for defining a confined zone between said gas inlet means and said gas discharge means, and said gas inlet means, gas discharge means and said confined zone being in gas flow communication such that a gaseous medium fed through said gas inlet means will flow into said confined zone through said gas discharge means and through said polymerization column.

2. The improved gas feed means of claim 1 wherein said upper portion is tubular shaped having a liner to accommodate the lower end of said polymerization column in frictional securement therewith.

3. The improved gas feed means of claim 2 wherein the liner is a resilient liner.

4. The improved gas feed means of claim 2 wherein the liner is plastic.

5. The improved gas feed means of claim 1 wherein said lower portion is tubular shaped and said support means is a stationary support member that is circumferencially disposed about and spaced from said tubular lower portion of the sleeve member by said bearing means.

6. The improved gas feed means of claim 5 wherein the bearing means comprises a bearing pair disposed between the tubular lower portion of the sleeve member and the stationary support member, each of said bearing means of said bearing pair being spaced apart by a first support ring member disposed adjacent the inner wall of the stationary support member and a second support ring member disposed adjacent the outer wall of the tubular portion of said sleeve member and said spaced-apart bearing means and first and second support ring members defining said confined zone.

7. The improved gas feed means of claim 6 wherein said first support ring member has an annular groove defined in its outer surface and at least one opening defined in the base of the groove which extends through said first support ring member, said first support ring member disposed adjacent the inner wall of the stationary support member such that said annular groove is disposed adjacent the gas inlet means in the stationary support member.

8. The improved gas feed means of claim 7 wherein said gas discharge means comprises at least one opening defined through the wall of said tubular lower portion and wherein at least one longitudinal grooves is defined in the inner wall of said tubular lower section which extends from communicating with said at least one opening up to the top of said lower tubular section.

9. The improved gas feed means of claim 8 wherein the at least one opening in the tubular lower portion is defined in a groove circumferentially formed about the lower tubular portion and wherein said second support ring member has at least one opening defined through its wall, said second support ring having a width larger than the width of the circumferential groove in said lower tubular portion, and said second support ring member being disposed over said circumferential groove forming a circumferential annular zone therebetween in communication with the at least one opening in the tubular lower portion of the sleeve and the at least opening on said second support ring member.

10. The improved gas feed means of claim 2 wherein the liner is tapered to accommodate a polymerization column having a lower tapered end.

* * * * *